US009772189B2

(12) United States Patent
Strandjord et al.

(10) Patent No.: US 9,772,189 B2
(45) Date of Patent: Sep. 26, 2017

(54) SYSTEMS AND METHODS FOR RESONANCE SWITCHING RESONATOR FIBER OPTIC GYROSCOPES (RFOGS) WITH FEED-FORWARD PROCESSING

(71) Applicant: Honeywell International Inc., Morristown, NJ (US)

(72) Inventors: Lee K. Strandjord, Tonka Bay, MN (US); Glen A. Sanders, Scottsdale, AZ (US); Waymon Ho, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 319 days.

(21) Appl. No.: 14/708,928

(22) Filed: May 11, 2015

(65) Prior Publication Data

US 2016/0334217 A1    Nov. 17, 2016

(51) Int. Cl.
G01C 19/72        (2006.01)
G01C 19/66        (2006.01)
G02B 6/293        (2006.01)

(52) U.S. Cl.
CPC ......... *G01C 19/662* (2013.01); *G01C 19/727* (2013.01); *G02B 6/2934* (2013.01)

(58) Field of Classification Search
CPC .... G01C 19/662; G01C 19/72; G01C 19/721; G01C 19/722; G01C 19/727; G02B 6/2934
See application file for complete search history.

(56) References Cited

U.S. PATENT DOCUMENTS

| 7,362,443 B2 | 4/2008 | Sanders et al. |
| 7,372,574 B2 | 5/2008 | Sanders et al. |
| 7,933,020 B1 | 4/2011 | Strandjord et al. |
| (Continued) | | |

FOREIGN PATENT DOCUMENTS

| EP | 2333482 | 6/2011 |
| EP | 2770298 | 8/2014 |

OTHER PUBLICATIONS

European Patent Office, "Extended European Search Report from EP Application No. 16157963.6 mailed Sep. 28, 2016", "from Foreign Counterpart of U.S. Appl. No. 14/708,928", Sep. 28, 2016, pp. 1-9, Published in: EP.

(Continued)

*Primary Examiner* — Michael A Lyons
(74) *Attorney, Agent, or Firm* — Fogg & Powers LLC

(57) ABSTRACT

Systems and methods for resonance switching RFOGs with feed-forward processing are provided. In one embodiment, a system comprises: a fiber optic resonator; first and second laser sources coupled to the resonator, wherein the first source launches a first beam into the resonator and the second source launches a second beam into the resonator in an opposite direction; a first servo loop that locks the first beam to a first resonant mode of the resonator during a first state and to a second resonant mode of the resonator during a second state; a second servo loop that locks the second beam to the second resonant mode during the first state and to the first resonant mode during the second state; a feed-forward rate processor coupled to the servo loops that calculates a FSR average across a prior resonance switching cycle of resonant frequency measurements and applies the average to current measurements.

20 Claims, 9 Drawing Sheets

(56) References Cited

U.S. PATENT DOCUMENTS

| | | |
|---|---|---|
| 8,223,341 B2 | 7/2012 | Strandjord et al. |
| 8,274,659 B2 | 9/2012 | Qiu et al. |
| 9,001,336 B1* | 4/2015 | Qiu .................... G01C 19/661 |
| | | 356/461 |
| 9,121,708 B1* | 9/2015 | Qiu .................... G01C 19/727 |
| 2014/0240712 A1 | 8/2014 | Strandjord et al. |
| 2015/0098089 A1* | 4/2015 | Schwartz ............ G01C 19/726 |
| | | 356/467 |

OTHER PUBLICATIONS

Armstrong, "Operators Manual and Technical Reference for the Z-Beamlet Phase Modulation Failsafe System: Version 1", "Sandia Report", Aug. 2013, pp. 1-78, Publisher: Sanida National Laboratories.

Mikkelsen et al., "Adiabatically widened silicon microrings for improved variation tolerance", "Optics Express", Apr. 21, 2014, pp. 9659-9666, vol. 22, No. 8.

Popovic et al., "Coupling-induced resonance frequency shifts in coupled dielectric multi-cavity filters", "Optics Express", Feb. 6, 2006, pp. 1208-1222, vol. 14, No. 3.

Ye et al., "Applications of Optical Cavities in Modern Atomic, Molecular, and Optical Physics", "Advances in Atomic, Molecular, and Optical Physics", Jul. 21, 2003, pp. 1-84, vol. 49.

* cited by examiner

SYSTEMS AND METHODS FOR RESONANCE SWITCHING RESONATOR FIBER OPTIC GYROSCOPES (RFOGS) WITH FEED-FORWARD PROCESSING

U.S. GOVERNMENT LICENSE RIGHTS

This invention was made with Government support under Government Contract No. HR0011-08-C-0019 awarded by DARPA. The Government has certain rights in the invention.

BACKGROUND

The resonator fiber optic gyroscope (RFOG) is a promising contender for next generation navigation gyroscope. It has the potential to provide a navigation grade solution with the combination of low cost, small package size and weight. The RFOG uses at least two laser beams, at least one propagates around a resonator coil in the clockwise (CW) direction and the other in the counter-clockwise (CCW) direction. In the operation of a resonant fiber optic gyroscope (RFOG), it is desirable to lock the frequencies of the laser light sources to the resonance frequencies of the fiber optic ring resonator using high bandwidth electronic servos. It is also known that operating the CW and CCW laser beams on different resonance modes of the fiber optic ring resonator can suppress single direction optical backscatter errors that degrade gyro performance. However, this is an incomplete solution because operating the CW and CCW laser beams on different resonance modes also introduces the gyro resonator free spectral range (FSR) as a component of the rotation rate measurement, which introduces temperature sensitivity errors to the rotation measurement. Furthermore, resonator lineshape asymmetries, for example, from either polarization errors or from double optical back-reflections or double backscatter will introduce a resonance center detection error that will be different between resonance modes and therefore introduces a rotation sensing error with a complex dependence on temperature.

For the reasons stated above and for other reasons stated below which will become apparent to those skilled in the art upon reading and understanding the specification, there is a need in the art for alternate systems and methods for providing resonance switching resonator fiber optic gyroscopes (RFOGs) with feed-forward processing.

SUMMARY

The Embodiments of the present invention provide methods and systems for providing resonance switching resonator fiber optic gyroscopes (RFOGs) with feed-forward processing and will be understood by reading and studying the following specification.

In one embodiment, a resonating fiber optic gyroscope system with feed-forward rotation rate processing comprises: a fiber optic resonator; a first laser source and a second laser source each coupled to the fiber optic resonator, wherein the first laser source launches a first optical beam into the fiber optic resonator and the second laser source launches a second optical beam into the fiber optic resonator in a direction opposite to the first optical beam; a first resonance switching servo loop configured to lock the first optical beam to a first resonant mode $M_1$ of the resonator during a first switching state, and lock the first optical beam to a second resonant mode $M_2$ of the resonator during a second switching state; a second resonance switching servo loop configured to lock the second optical beam to the second resonant mode $M_2$ during the first switching state, and lock the first resonant frequency of the first resonant mode $M_1$ during the second switching state; a feed-forward rate processor coupled to the first resonance switching servo loop and the second resonance switching servo loop, wherein the feed-forward rate processor calculates a free spectral range average across a prior resonance switching cycle of resonant frequency measurements and applies the free spectral range average to current resonant frequency measurements to output a rotation rate measurement frequency value $f_\Omega$ sample signal.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide for resonator fiber optic gyroscope that utilize a combination of resonance switching and feed-forward data processing to produce measurements of the rotation rate frequency value, $f_\Omega$, and thus rotation rate ($\Omega$) measurements, that correct for backscatter errors while also compensating for free spectral range errors and line shape asymmetry gradient due to double optical backscatter. With the embodiments presented herein, each of the two counter-propagating optical beams of the gyroscope are locked to a different resonant mode of the resonator for a fixed period of time, and then the frequencies of the optical beams are switched to swap resonant modes the beams are locked onto for a second period of time. Operating of the gyroscope continues by periodically alternating the optical beams between the two resonance modes. This operation provides sufficient information for the gyroscope to calculate a rotation rate frequency value $f_\Omega$ that is free from both FSR and line shape asymmetry gradient error influences. The embodiments presented herein further provide for a feed-forward calculation mechanism that separates the measurement frequency at which the gyroscope can produce rotation rate frequency samples, and the frequency of switching between resonant modes so that each of these two frequency parameters may be independently established.

Figure 1:
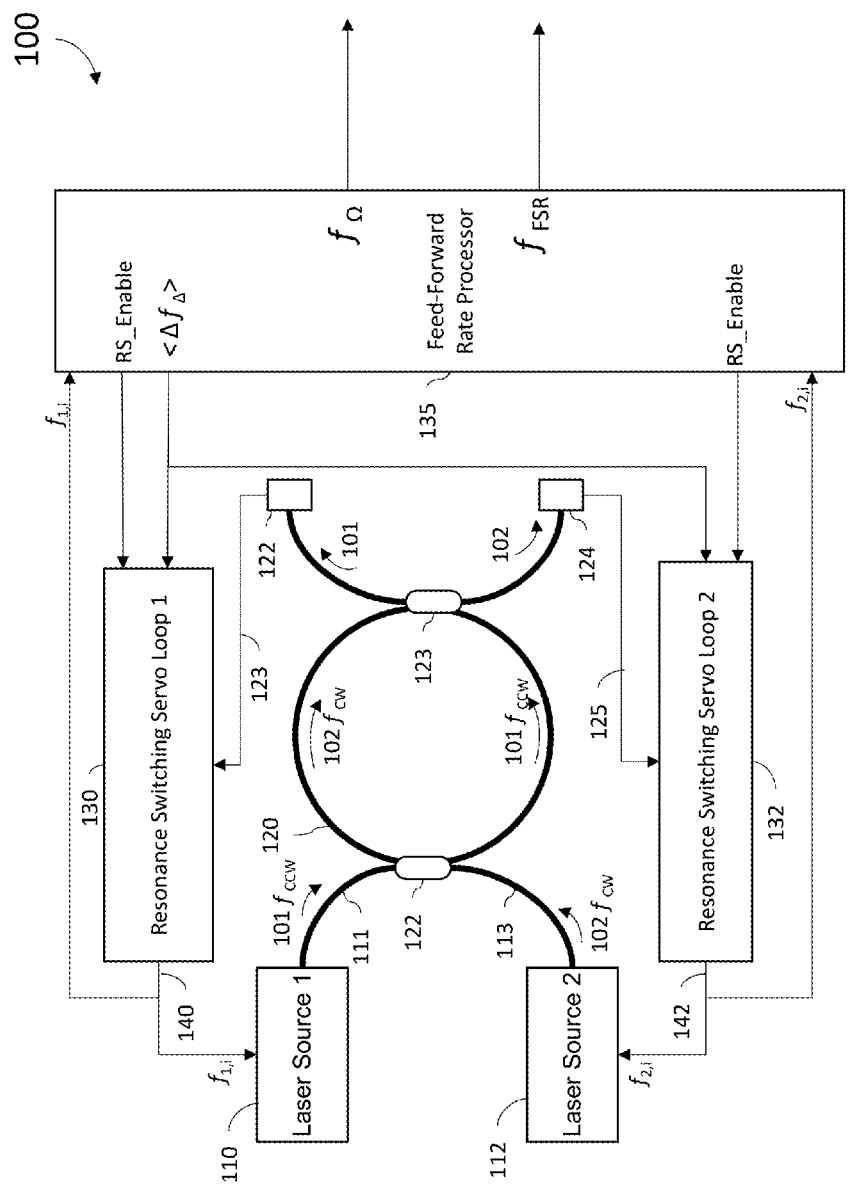
FIG. 1 is a block diagram of a resonating fiber optic gyroscope system with feed-forward rotation rate processing of one embodiment of the present disclosure.

FIG. 1 is a block diagram illustrating a resonator fiber optic gyroscope (RFOG) 100 of one embodiment of the present disclosure. RFOG 100 comprises a first laser source 110 and second laser source 112 each coupled to a fiber optic resonator 120 by at least one optical coupler 122. RFOG 100 further comprises a first resonance switching servo loop 130, a second resonance switching servo loop 132, and a feed-forward rate processor 135, each of which are discussed in greater detail below.

As shown in FIG. 1, laser source 110 outputs a first optical beam 101 of laser light that is coupled into resonator 120 by coupler 122 and travels around resonator 120 in a first direction. For the example of FIG. 1, the first optical beam 101 is defined as traveling around resonator 120 in a counter-clockwise (CCW) direction. Laser source 112 outputs a second optical beam 102 of laser light that is coupled into resonator 120 by coupler 122 and travels around resonator 120 in a second direction that is opposite to the first direction traveled by optical beam 101. For the example of FIG. 1, the second optical beam 102 is defined as traveling around resonator 120 in a clockwise (CW) direction.

Laser sources 110 and 112 are each controlled by respective resonance switching servo loops 1 and 2 (shown at 130 and 132) to maintain the frequencies of optical beams 101 and 102 at resonance frequencies of the resonator 120. For example, Laser source 110 launches optical beam 101 into resonator 120 at a specific optical frequency (shown in FIG. 1 as fccw). At that frequency, fccw, optical beam 101 will exhibit a specific wavelength, λccw (which for laser light can be a wavelength on the order of 1.5 microns, for example). When optical beam 101 is tuned to a frequency fccw such that exactly an integer multiple of wavelengths λccw are propagating around resonator 120, then optical beam 101 is said to be operating at a resonant frequency of the resonator 120 (which can also be referred to as one of the resonant modes of the resonator 120). At this frequency, with each pass that optical beam 101 travels around the loop of resonator 120, the optical beam is in phase with its previous pass and the optical power from each pass accumulates to a peak resonant intensity. Any deviation in fccw from a resonance frequency will cause optical power within resonator 120 to sum to less than the peak resonant intensity.

With embodiments of the present disclosure, the first laser source 110 and the second laser source 112 are controlled by their respective servo loops (130 and 132) to remain locked to different resonance modes with respect to each other. That is, if optical beam 101 is locked to a resonant frequency foa (where an integer number, I, of wavelengths are propagating in the CCW direction around resonator 120), then optical beam 102 is locked to a resonant frequency fob (where an integer number, J≠I, of wavelengths are propagating in the CW direction around resonator 120). Adjacent resonant frequencies are separated from each other based on a function of the free spectral range (FSR) of resonator 120, a difference referred to herein as $f_{FSR}$. As such, when foa is less than fob by exactly $1f_{FSR}$, then optical beam 102 is said to be operating at the next higher resonant mode than optical beam 101, and optical beam 101 is said to be operating at the next lower resonant mode than optical beam 102. Operation of laser sources 110 and 112 to produce optical beams 101 and 102 at adjacent resonant modes (shown at $M_1$ and $M_2$) is further illustrated by the intensity vs frequency graphs shown in FIG. 1A. As shown generally at 160, optical beam 101 is driven to a frequency fccw that is equal to the frequency foa corresponding to a first resonant mode $M_1$. As shown generally at 162, optical beam 102 is driven to a frequency fcw equal to the frequency fob corresponding to a second resonant mode $M_2$. The frequency difference between the peak resonant intensity at mode $M_1$ and the peak resonant intensity at mode $M_2$ is equal to the $f_{FSR}$. For the examples illustrated in this disclosure, laser source 110 and laser source 112 operate at adjacent resonant modes $M_1$, $M_2$ separated by 1 $f_{FSR}$. However, it should be appreciated that additional embodiments are conceived as within the scope of the present disclosure where laser source 110 and laser source 112 are operated at frequencies $M_1$, $M_2$ separated by other integer multiples of $f_{FSR}$.

As mentioned above, the frequency fccw of optical beam 101 is locked to a resonance frequency foa by the first resonance switching servo loop 130 while the frequency fcw of optical beam 102 is locked to a resonance frequency fob by the second resonance switching servo loop 132. In one embodiment, this is accomplished by operating servo loops 130 and 132 as frequency locked loops. More specifically, the CCW optical beam is frequency or phase modulated to interrogate the resonator. A portion of the CCW propagating optical beam 101 is coupled out of resonator 120 by an optical coupler 123 and delivered to a first photodetector 122, which measures the optical intensity of optical beam 101. From this measurement, photodetector 122 produces a resonance tracking signal 123, which is an electrical signal that varies as a function of the measured optical intensity. When the average optical frequency of the CCW beam is on resonance the photodetector output will not have a frequency component at the modulation frequency. To first order, the photodetector output at the modulation frequency will be proportional to small average optical frequency deviations from the resonance frequency. Deviation from resonance frequency foa produces a tracking error at the modulation frequency reflected in resonance tracking signal 123. First resonance switching servo loop 130 inputs the resonance tracking signal 123 at the modulation frequency and outputs a control signal 140 to laser source 110 that adjusts the frequency fccw of optical beam 101 to drive the tracking error at the modulation frequency to zero (i.e., control signal 140 drives optical beam 101 to the desired resonance frequency). In the same way, a portion of the CW propagating optical beam 102 is coupled out of resonator 120 by optical coupler 123 and delivered to a second photodetector 124, which measures the optical intensity of optical beam 102. From this measurement, photodetector 124 produces a resonance tracking signal 125, which is an electrical signal that varies as a function of the measured optical intensity. When the average optical frequency of the CW beam is on resonance the photodetector output will not have a frequency component at the modulation frequency. To first order, the photodetector output at the modulation frequency will be proportional to small average optical frequency deviations from the resonance frequency. Deviation from resonance frequency fob produces a tracking error at the modulation frequency reflected in resonance tracking signal 125. The second resonance switching servo loop 132 inputs the resonance tracking signal 125 and outputs a control signal 142 to laser source 112 that adjusts the frequency fcw of optical beam 102 to drive the tracking error at the modulation frequency to zero (i.e., control signal 142 drives optical beam 102 to the desired resonance frequency). The phase, or frequency modulation applied within RFOG 100 prior to resonator 120 to facilitate detection of when each of the beams are at a resonance mode is described by U.S. Pat. No. 7,362,443 which is incorporated herein by reference.

The resonance switching servo loops 130 and 132 are referred to as "resonance switching" because the embodiments described by present disclosure periodically swap the respective resonator modes used for optical beams 101 and 102. That is, after operating for a fixed period of time with optical beam 101 at resonance frequency foa (Mode $M_1$) and optical beam 102 at resonance frequency fob (Mode $M_2$), resonance switching servo loops 130 and 132 will switch optical beam 101 from resonance frequency foa to resonance frequency fob while simultaneously switching optical beam 102 from resonance frequency fob to resonance frequency foa. Alternating each optical beam between different resonance modes in this manner further facilities mitigation of interference type backscatter error, errors caused by temperature induced variations in the FSR, and lineshape asymmetry gradient errors caused by double optical backscatter or back-reflections, as further described below.

Figure 1A:
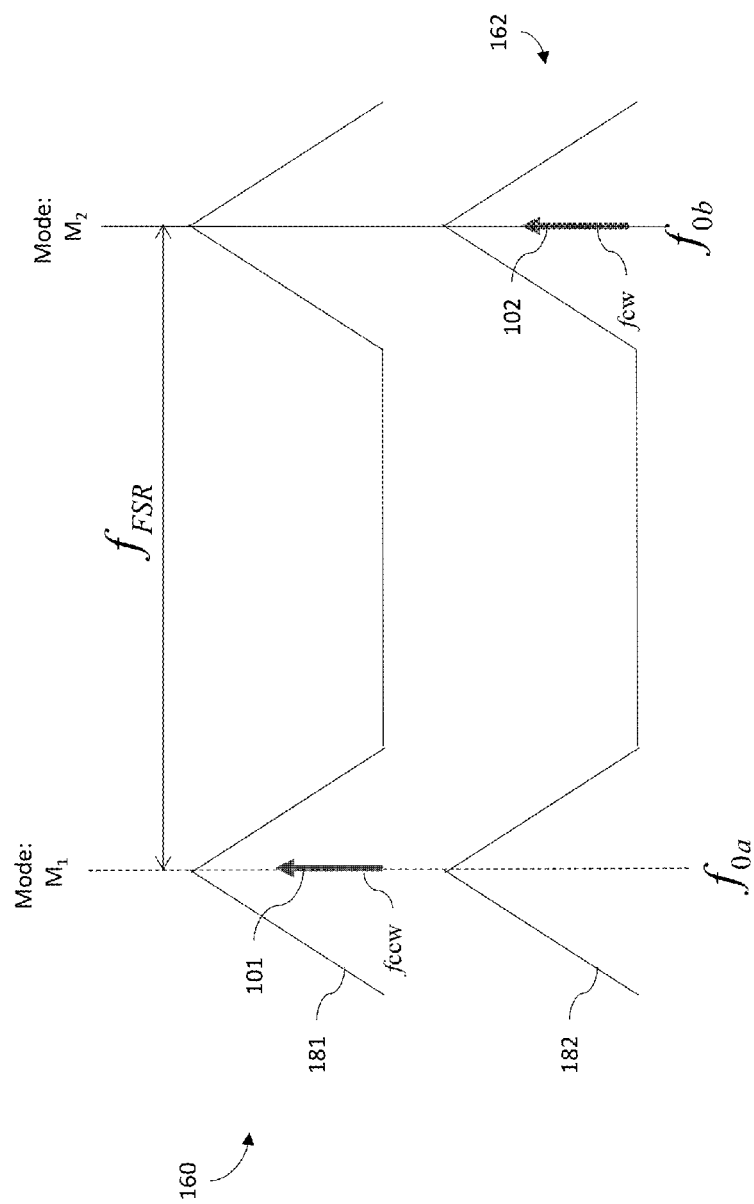
FIGS. 1A and 1B are diagrams illustrating resonant modes of resonator of a resonating fiber optic gyroscope system of one embodiment of the present disclosure.
Figure 1B:
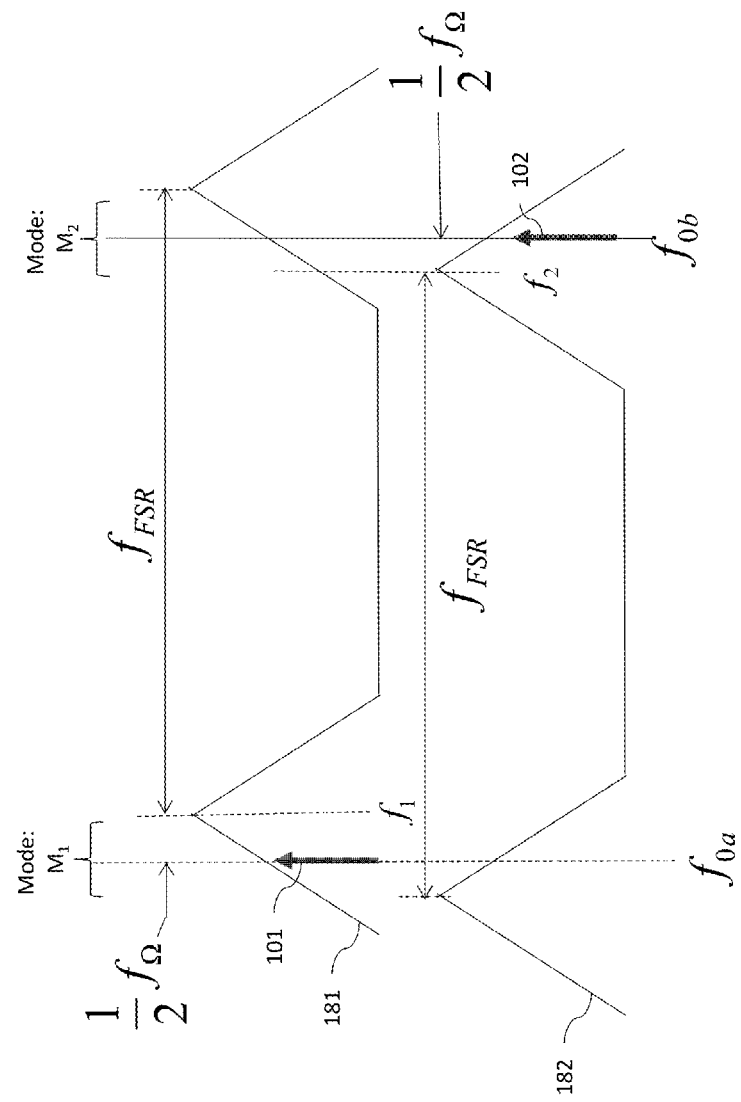

FIG. 1A, discussed above, illustrates adjacent resonance modes for optical beams 101 and 102 under the condition that resonator 120 is not experiencing any rotation (i.e., has an angular rotation rate such that $f_\Omega=0$). When resonator 120 is not undergoing rotation, the various resonance modes for light traveling in the CW direction (shown by curve 182) will align in frequency with the various resonance modes for light traveling in the CCW direction (shown by curve 181), as is indicated in FIG. 1A. However, when resonator 120 is experiencing rotation with respect to its sensing axis, the respective path lengths travelled by light in the CW and CCW directions will no longer be equal, exhibiting a phenomena known as the Sagnac effect. For example, if resonator begins rotating in the CCW direction, the distance that optical beam 101 must travel to complete one trip around resonator 120 increases in length, while the distance that optical beam 102 must travel to complete one trip around resonator 120 decreases in length. For a given frequency of light, the number of wavelengths that fit within the CW and CCW paths become dissimilar, and therefore the resonance modes associated with each direction will no longer align with each other. As shown in FIG. 1B, the resonant frequency for the CCW direction 181 which optical beam 101 was locked to shifts from $f_{oa}$ (the non-rotation resonant frequency for resonance mode $M_1$) to $f_1$, a shift of $\frac{1}{2}f_\Omega$ caused by rotation. The resonant frequency for the CW direction 182 which optical beam 102 was locked to shifts from $f_{ob}$ (the non-rotation resonant frequency for resonance mode $M_2$) to $f_2$, a shift of $\frac{1}{2}f_\Omega$ caused by rotation. For FIG. 1B, the frequencies of optical beams 101 and 102 have remained unchanged from the zero rotational resonance frequencies $f_{oa}$ and $f_{ob}$. In this case, a resonance tracking error signal is present until the resonance switching loop controls the laser frequencies two the new resonance frequencies to $f_1$ and $f_2$.

Figure 2:
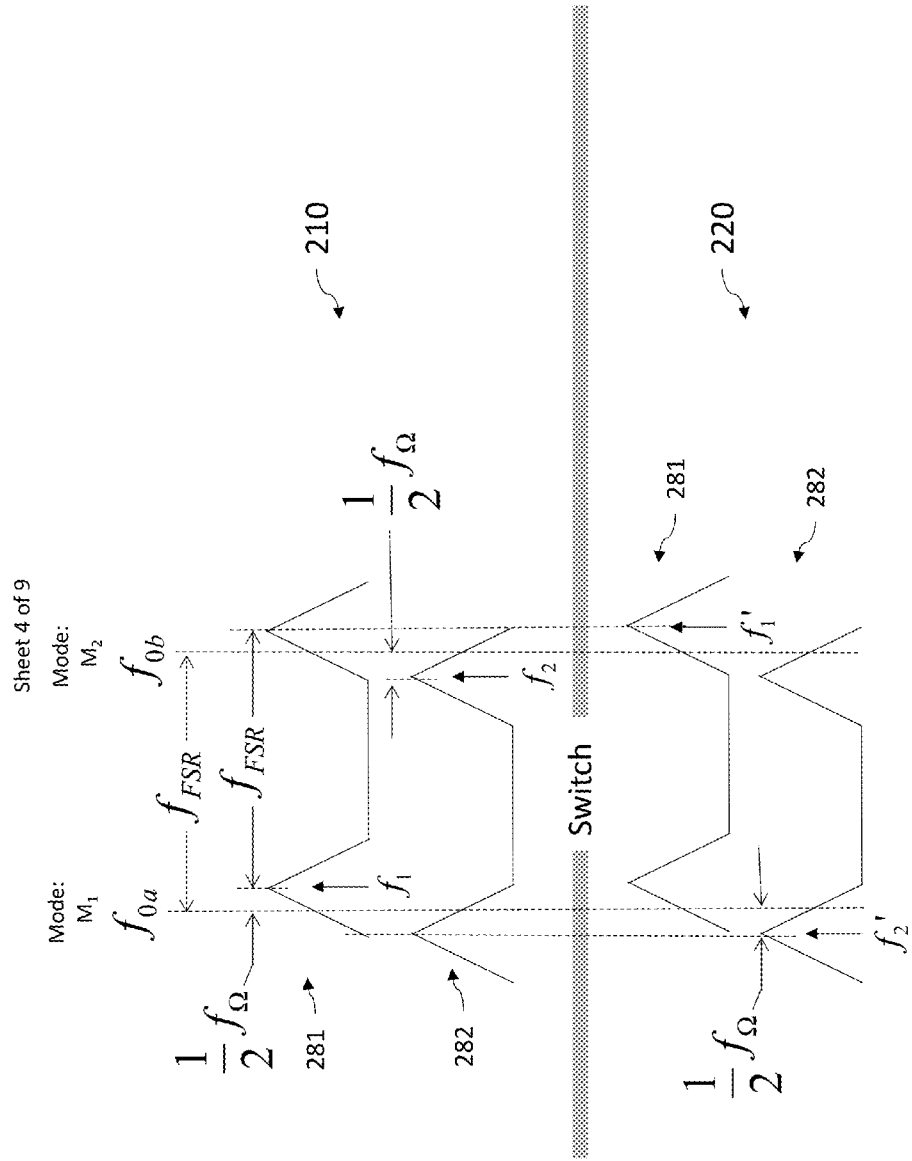
FIG. 2 is a diagram illustrating resonant mode switching for a resonating fiber optic gyroscope system of one embodiment of the present disclosure.

Referring to FIG. 2, operation of RFOG 100 during a first switching state is shown generally at 210 where optical beam 101 is locked to resonant mode $M_1$ and optical beam 102 is locked to the adjacent resonant mode $M_2$. Due to rotation of resonator 120, in the path traveled by optical beam 101 the frequency of resonance mode $M_1$ has shifted from the initial resonant frequency foa to resonant frequency $f_1$ (as shown generally at 281). This shift is directly a function of the rate of rotation and equal to $\frac{1}{2}f_\Omega$. In the path traveled by optical beam 102, the frequency of resonance mode $M_2$ has shifted in the opposite direction from the initial resonant frequency fob to a new resonant frequency $f_2$ (as shown generally at 282). This shift is also directly a function of the rate of rotation and equal to $\frac{1}{2}f_\Omega$. In the manner described above, resonance switching servo loops 130 and 132 will adjust and drive optical beams 101 and 102 to maintain them at these new respective resonant frequencies $f_1$ and $f_2$. The shifts in the resonance frequencies and their relationship to the rotation rate of resonator 120 can be expressed as:

$$f_1 = f_{0a} + \frac{1}{2}f_\Omega$$

$$f_2 = f_{0a} + f_{FSR} - \frac{1}{2}f_\Omega$$

$$\Delta f = f_1 - f_2 = -f_{FSR} + f_\Omega$$

Thus it is evident that $\Delta f$ includes a measurement of the rotation rate $f_\Omega$, but also includes a component of the FSR. The total length of resonator 120 will expand and contract with temperature and for that reason FSR is a variable element that will change with the temperature. For that reason, the $f_{FSR}$ cannot be readily accounted for to obtain $f_\Omega$ from $\Delta f$. However, switching operation of RFOG 100 to the second switching state that swaps resonant modes between optical beam 101 and 102 leads to the development of a set of two independent linear equations with two unknowns, which permits solving for both $f_{FSR}$ and $f_\Omega$.

Operation of RFOG 100 in the second switching state is shown generally at 220 where optical beam 101 is now locked to resonant mode $M_2$ and optical beam 102 is locked to the adjacent resonant mode $M_1$ and the shifts in resonant frequencies in the CCW and CW directions due to rotation are shown respectively at 283 and 284 In this state, the shifts in the resonance frequencies and their relationship to the rotation rate of resonator 120 can be expressed as:

$$f_1' = f_{0a} + f_{FSR} + \frac{1}{2}f_\Omega$$

$$f_2' = f_{0a} - \frac{1}{2}f_\Omega$$

$$\Delta f' = f_1' - f_2' = f_{FSR} + f_\Omega$$

By adding the equations for Δf and Δf':

$$\Delta f_+ = \Delta f' + \Delta f = 2f_\Omega$$

which is an expression for the rotation rate frequency value $f_\Omega$ without the influence of a $f_{FSR}$ component. Similarly, by subtracting the equations for Δf and Δf':

$$\Delta f_\Delta = \Delta f' - \Delta f = 2f_{FSR}$$

which provides an expression to calculate the $f_{FSR}$ without the influence a rotation rate frequency value $f_\Omega$ component.

Advantageously, calculation of $\Delta f_+$ in the manner describe above by switching the optical beams 101 and 102 between resonant modes $M_1$ and $M_2$ also serves to produce a value of $2f_\Omega$ from which the effects of lineshape asymmetry gradient error have been canceled. That is, when frequency shifts due to lineshape asymmetry are included in the above analysis, the expressions for operation in the first switching state become:

$$f_1 = f_{0a} + \delta f_a + \frac{1}{2}f_\Omega$$

$$f_2 = f_{0a} + f_{FSR} + \delta f_b - \frac{1}{2}f_\Omega$$

$$\Delta f = f_1 + f_2 = (\delta f_a - \delta f_b) - f_{FSR} + f_\Omega$$

where $\delta f_a$ is the frequency shift in optical beam 101 due to lineshape asymmetry when optical beam 101 is locked to resonant mode $M_1$, and $\delta f_b$ is the frequency shift in optical beam 102 due to lineshape asymmetry when optical beam 102 is locked to resonant mode $M_2$.

The expressions for operation in the second switching state become:

$$f_1' = f_{0a} + f_{FSR} + \delta f_b + \frac{1}{2}f_\Omega$$

$$f_2' = f_{0a} + \delta f_a - \frac{1}{2}f_\Omega$$

$$\Delta f' = f_1' - f_2' = -(\delta f_a - \delta f_b) + f_{FSR} + f_\Omega$$

So that once again:

$$\Delta f_+ = \Delta f' + \Delta f = 2f_\Omega$$

which is an expression for the rotation rate frequency value $f_\Omega$ without the influence of either a $f_{FSR}$ or lineshape asymmetry component.

To facilitate the above calculations, resonance switching servo loop 130 and resonance switching servo loop 132 repeatedly cycle between the first switching state and the second switching state so that during the first half of each cycle laser source 110 is locked to resonance mode $M_1$ and laser source 112 is locked to resonance mode $M_2$, and during the second half of each cycle laser source 110 is locked to resonance mode $M_2$ and laser source 112 is locked to resonance mode $M_1$. Consistent with the above, resonance switching servo loop 130 outputs a control signal 140 equal to $f_1$ for the first half of each cycle, and equal to $f_1'$ for the second half of each cycle. Likewise, resonance switching servo loop 132 outputs a control signal 142 equal to $f_2$ for the first half of each cycle, and equal to $f_2'$ for the second half of each cycle. As shown in FIG. 1, control signal 140 and control signal 142 are also each provided to feed-forward rate processors 135, so that feed-forward rate processors 135 can calculate $\Delta f_+$ and from that output rotation rate measurements Ω from rotation rate frequency value $f_\Omega$. In some implementations, feed-forward rate processor 135 may further utilize the values provided by control signal 140 and control signal 142 to calculate $\Delta f_\Delta$ and from that output FSR measurements $f_{FSR}$.

Because FSR changes with temperature, feed-forward rate processor 135 needs to continuously re-calculate $\Delta f_+$ quickly enough to accommodate changes in FSR. Otherwise, if $\Delta f_+$ is calculated from old data that does not represent current conditions, some fraction of FSR will enter into, and therefore corrupt, the rotation rate output. Resonant frequency switching needs to occur at a sufficiently high frequency so that FSR error is canceled out from the rotation rate calculations. However, switching too frequently also has drawbacks. During the finite period of time in which the servos 130 and 132 are actually performing the switch between resonant modes $M_1$ and $M_2$, the frequency data carried by control signal 140 and control signal 142 becomes corrupted and unusable. Increasing the resonance switching frequency therefore also increases the fraction of corrupted and unusable data sent to feed-forward rate processor 135 per each resonance switching cycle, decreasing the usable fraction of data that feed-forward rate processor 135 has to work with per switching cycle. Further, a completely independent consideration is the rate at which RFOG 100 needs to output fresh rotation rate measurement samples to satisfy system design criteria. The measurement sample output rate will likely be many orders of magnitude faster than the optimal resonance switching frequency. For example, where it may be optimal based on expected temperature dynamics for the switching state to be switched once per second (i.e., 1 Hz), for navigation applications, RFOG 100 may be called on to provide rotation rate measurement samples at a frequency of 1 kHz or greater.

Figure 3:
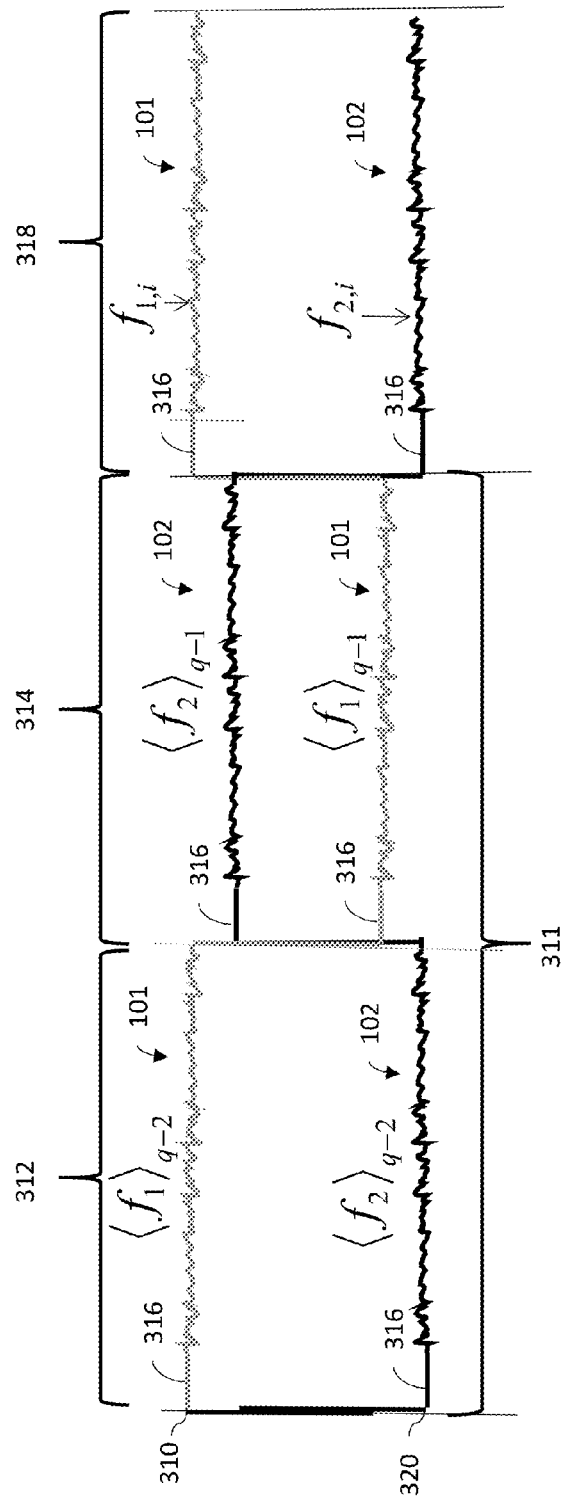
FIG. 3 is a diagram illustrating feed-forward rotation rate processing of one embodiment of the present disclosure.

In order to provide for a slower resonance switching frequency that does not limit RFOG 100's sensing bandwidth, feed-forward rate processor 135 also employees the feed forward mechanism illustrated in FIG. 3. In FIG. 3, curve 310 is a plot of frequency $f_1$ of the first optical beam 101 verses time while it is alternatively locked to the two ccw resonances, while curve 320 is a plot of frequency $f_2$ of the second optical beam 102 verses time while it is alternatively locked to the two cw resonances. During each steady state time interval, 312, 314, and 318 (except during transient period 316) $f_1$ and $f_2$ are assumed to be locked to a resonance frequency of the resonator, so $f_1$ and $f_2$ are indicative of both the input beam frequencies and the measured ccw and cw resonator resonance frequencies, respectively. In one implementation, feed-forward rate processor 135 includes one or more digital signal processing units that calculate a first resonance frequency average $<f_1>$ based on the output of optical beam 101 from the resonator, and a second resonance frequency average $<f_2>$ based on the output of optical beam 102 from the resonator, for each half of a switching cycle. Using the difference between resonance frequency averages $<f_1>$, $<f_2>$, obtained from both a first and second half of a switching cycle, an average $<\Delta f_\Delta>$ may be calculated that is equal to $<2f_{FSR}>$, which is proportional to the average FSR of resonator 120 over the period of the full switching cycle 311. Because, FSR is expected to change with temperature, but not at a rate comparable to the rate at which RFOG 100 outputs rotation rate measurement samples, this $<2f_{FSR}>$ measured from the immediately prior switching cycle 311 is used by feed-forward rate processor 135 to cancel $f_{FSR}$ from current $f_1$ and $f_2$ resonant frequency measurements. That is, the $<2f_{FSR}>$ calculated for a past resonance switching cycle is fed-forward to and applied to the high frequency present frequency measurements to compensate for FSR during the current switching cycle, until a new $<2f_{FSR}>$ is calculated for the current switching cycle. This new $<2f_{FSR}>$ will then be fed-forward feed-forward rate processor 135 for use to compensate for FSR for the next switching cycle. At any point during any half-cycle (that is, regardless of the current switching state) a corrected current rotation rate frequency value $f_\Omega$ measurement may be calculated by feed-forward rate processor 135 from:

$$\Delta f_c = f_1 - f_2 + \frac{1}{2} <\Delta f_\Delta> = -f_\Omega$$

where $f_1$ and $f_2$ are current resonant frequency measurements (since cw and ccw beam frequencies are locked to cw and ccw resonance frequencies of the resonator, respectively) provided from the outputs of resonance switching servo loop 130 and resonance switching servo loop 132, and $<\Delta f_\Delta>$ is the fed-forward $f_{FSR}$ error correction (which may also include a lineshape asymmetry gradient correction as explained above) calculated from a past switching cycle.

As shown generally at 311, a previous full cycle of resonant frequency measurements comprises a first ½ cycle where optical beam 101 is locked to resonant mode $M_1$ and optical beam 102 is locked to resonant mode $M_2$ (shown at 312) and second ½ cycle where optical beam 101 is locked to resonant mode $M_2$ and optical beam 102 is locked to resonant mode $M_1$ (shown at 314). In FIG. 3, measurement samples resonant frequency switching states are indicated by the index reference "q" while the index "i" indicates resonant frequency $f_1, f_2$ measurement samples produced by resonance switching servo loops 130 and 132. Also, in FIG. 3, the higher frequency is represented by the lower of the two traces, consistent with the resonance frequency of mode $M_2$ being higher than the resonance frequency of mode $M_1$. Referring to FIG. 3 at 314, the average $<f_1>_{q-1}$ is the average of the measured resonant frequency $f_1$ values captured while optical beam 101 was locked to resonant mode $M_2$ during the full cycle 311 of resonant frequency measurements. The average $<f_2>_{q-1}$ is the average of the measured resonant frequency $f_2$ values captured while optical beam 102 was locked to resonant mode $M_1$ during the full cycle 310 of resonant frequency measurements. Referring to FIG. 3 at 312, the average $<f_1>_{q-2}$ is the average of the resonant frequency $f_1$ values captured while optical beam 101 was locked to resonant mode $M_1$ during the full cycle 311 of resonant frequency measurements. The average $<f_2>_{q-2}$ is the average of the resonant frequency $f_2$ values captured while optical beam 102 was locked to resonant mode $M_2$ during the full cycle 311 of resonant frequency measurements. It should be noted that at 316, each of the resonant frequencies are flat-lined immediately after switching between modes $M_1$ and $M_2$ is initiated. During these transient periods, the $f_1$ values and $f_2$ values are blanked out and unused so as not to affect the calculation of the $<f_1>$ and $<f_2>$ averages. The two half-cycles 312 and 314 together form a full resonance switching cycle 311 from which a $<\Delta f_\Delta>$ may be calculated as follows. From the first half cycle at 312:

$$<\Delta f>_{q-2} = <f_1>_{q-2} - <f_2>_{q-2}$$

and from the second half cycle at 314:

$$<\Delta f>_{q-1} = <f_1>_{q-1} - <f_2>_{q-1}$$

Subtracting the first from the second provides:

$$<\Delta f_\Delta>_{q-1} = <\Delta f>_{q-1} - <\Delta f>_{q-2} = <2f_{FSR}>$$

This current estimate of the FSR is then fed-forward to apply to the current resonant frequency values $f_{1,i}$ and $f_{2,i}$ (shown at 318) from the servos 130, 132 using:

$$\Delta f_i = f_{1,i} - f_{2,i} + \frac{1}{2} <\Delta f_\Delta>_{q-1} = f_{\Omega,i}$$

resulting in a current measurement of rotation rate measurement $f_{\Omega,i}$ which is compensated for FSR error and lineshape asymmetry gradient error, and which may be calculated at a sample frequency many order of magnitudes higher than the resonance switching frequency used to estimate FSR from $<\Delta f_\Delta>$.

Figure 4:
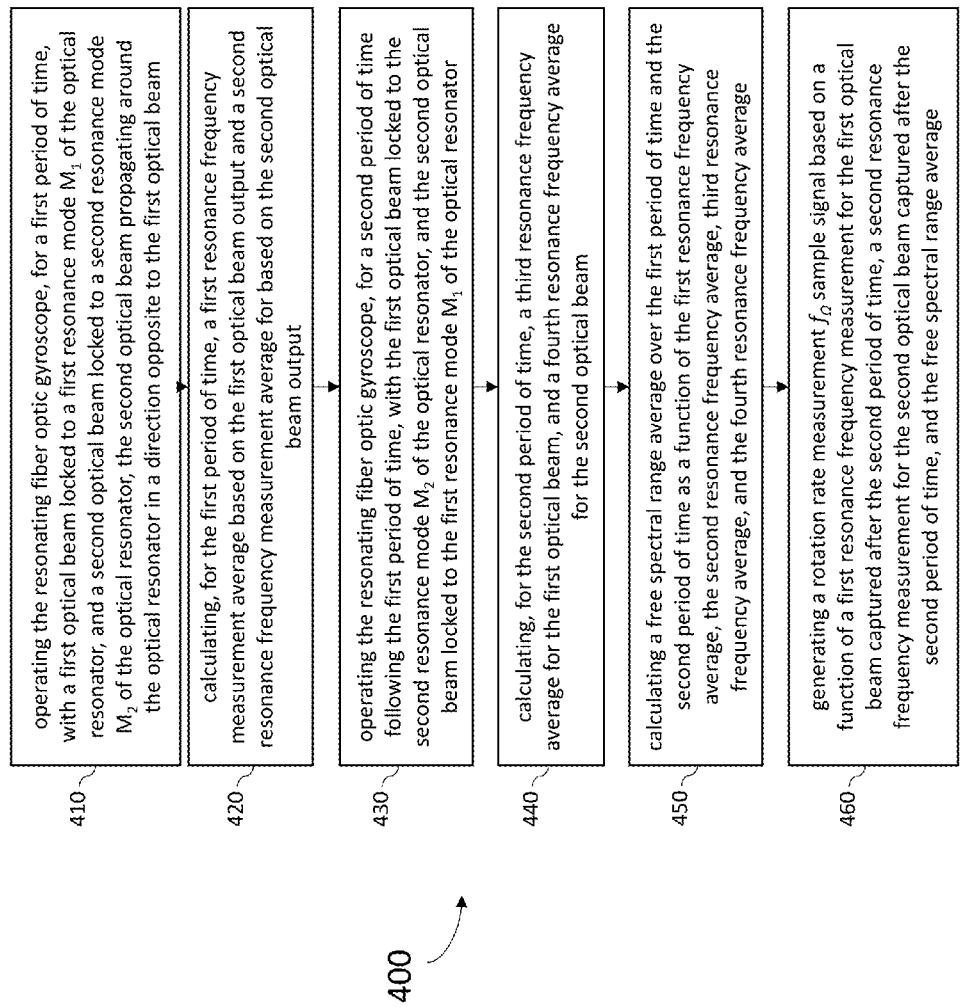
FIG. 4 is a flow chart illustrating a method of one embodiment of the present disclosure.

FIG. 4 is a flow chart illustrating one implementation of a feed-forward rotation rate processing method 400 implemented with an resonating fiber optic gyroscope. In one embodiment, method 400 is implemented in combination with the feed-forward rate processor 135 of the RFOG 100 described herein. As such, descriptions, options and alternatives described herein with respect to RFOG 100 or any of its component elements may be utilized in combination with elements of method 400 and vice versa. Method 400 begins at 410 with operating the resonating fiber optic gyroscope, for a first period of time, with a first optical beam locked to a first resonance mode $M_1$ of the optical resonator, and a second optical beam locked to a second resonance mode $M_2$ of the optical resonator, the second optical beam propagating around the optical resonator in a direction opposite to the first optical beam. In one embodiment, the first resonance mode separated from the second resonance mode by a single FSR. As described above, the resonating fiber optic gyroscope comprises a pair of laser sources that each launch one of the optical beams into a fiber coil resonator. The frequency of the first laser source is locked to the first resonance mode $M_1$ by a feedback control signal produced from a first resonance switching servo loop. The frequency of the second laser source is locked to the second resonance mode $M_2$ by a feedback control signal produced from a second resonance switching servo loop. The first and second resonance switching servo loops are each coupled to respective first and second photo detectors that measure the optical power of the respective optical beams. In some embodiments, the optical beams each have an optical phase modulation applied prior to reaching the resonator, and the first and second resonance switching servo loops demodulate the optical beams to further determine when the frequencies of the optical beams are locked to resonance modes of the resonator.

The method proceeds to 420 with calculating, for the first period of time, a first resonance frequency measurement average based on the first optical beam output and a second resonance frequency measurement average for based on the second optical beam output. For example, referring to FIG. 3, period 311 represents period of time for the last fully completed switching cycle where 312 is the ½ cycle time period in which the first optical beam is locked to resonance mode $M_1$ and the second optical beam is locked to resonance mode $M_2$. The method 400 at block 420 calculates the first resonance frequency average $<f_1>_{q-2}$, and the second resonance frequency average $<f_2>_{q-2}$ for the ½ cycle time period 312.

The method proceeds to 430 with operating the resonating fiber optic gyroscope, for a second period of time following the first period of time, with the first optical beam locked to the second resonance mode $M_2$ of the optical resonator, and the second optical beam locked to the first resonance mode $M_1$ of the optical resonator. Here, the resonating fiber optic gyroscope except that the first and second resonance switching servo loop have switched operation from a first switch state in block 410 to a second switch state in block 430. That is they have each swapped operating their respective laser sources between resonant modes $M_1$ and $M_2$.

The method proceeds to 440 with calculating, for the second period of time, a third resonance frequency average for the first optical beam, and a fourth resonance frequency average for the second optical beam. For example, referring to FIG. 3, period 314 is the ½ cycle time period in which the first optical beam is locked to resonance mode $M_2$ and the second optical beam is locked to resonance mode $M_1$. The method 400 at block 440 calculates the third resonance frequency average $<f_1>_{q-1}$, and the fourth resonance frequency average $<f_2>_{q-1}$ for the ½ cycle time period 314.

The method proceeds to 450 with calculating a free spectral range average over the first period of time and the second period of time as a function of the first resonance frequency average, the second resonance frequency average, third resonance frequency average, and the fourth resonance frequency average. For example, in one implementation, a free spectral range average for the resonator may be calculated by determining $<\Delta f_\Delta>_{q-1}$ as follows:

$$<\Delta f>_{q-2} = <f_1>_{q-2} - <f_2>_{q-2}$$

$$<\Delta f>_{q-1} = <f_1>_{q-1} - <f_2>_{q-1}$$

$$<\Delta f_\Delta>_{q-1} = <\Delta f>_{q-1} - <\Delta f>_{q-2} = <2f_{FSR}>$$

The method proceeds to 460 with generating a rotation rate measurement $f_\Omega$ sample signal based on a function of a first resonance frequency measurement for the first optical beam captured after the second period of time, a second resonance frequency measurement for the second optical beam captured after the second period of time, and the free spectral range average. As shown above, in one implementation, the rotation rate measurement sample $f_\Omega$ from:

$$-f_{\Omega,i} = f_{1,i} - f_{2,i} + \frac{1}{2} <\Delta f_\Delta>_{q-1}$$

Figure 5:
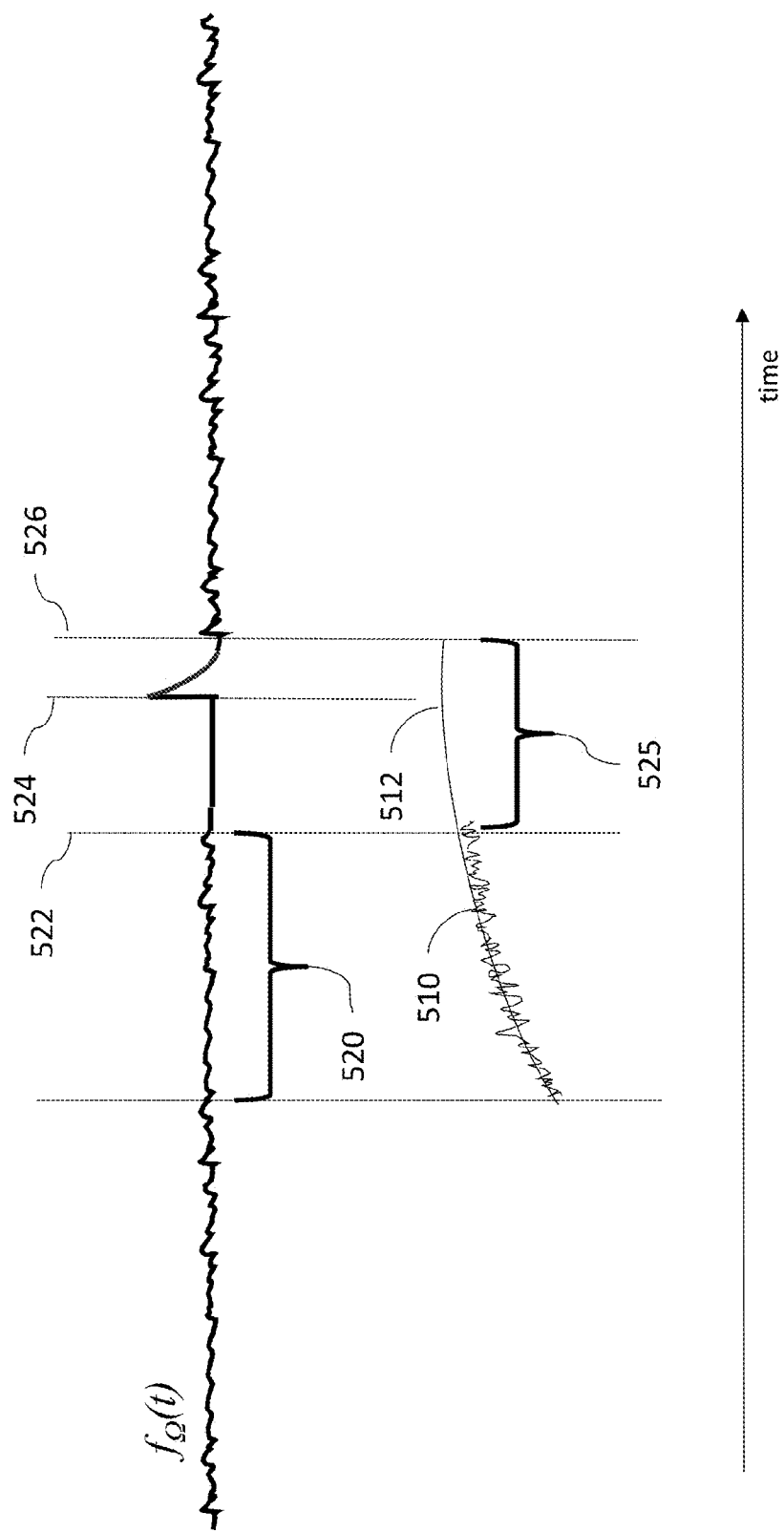
FIG. 5 is a diagram illustrating extrapolation of rotation rate data for one embodiment of the present disclosure.

To address the issue of corrupted data during switching operations, in one implementation, feed-forward rate processor 135 applies an extrapolation to fill in for corrupted measurements, as illustrated in FIG. 5. In one embodiment, as feed-forward rate processor 135 calculates and stores into memory rotation rate measurements $f_\Omega$, it also calculates a statistical curve fit 510 over a pre-specified segment of valid $f_\Omega$ data (shown at 520) occurring just before a resonant mode switch operation(shown at 522). The statistical curve fit 510 may be calculated as a linear average, a weighted average, a quadratic fit, or other curve fit. When the resonant mode switch is initiated (shown at 522), the first and second resonance switching servo loops 130 and 132 will unlock from tracking their respective resonant frequencies. At this point, the first and second resonance switching servo loops 130 and 132 will be reconfigured to swap resonant modes. The servo loops 130 and 132 are closed (shown at 524) and eventually lock onto their new respective resonant frequencies (shown at 526). For the time period where the servo loops 130 and 132 are not locked to a resonant frequency (shown at 525), the $f_1$ and $f_2$ values conveyed by control signals 140 and 142 will be corrupted and so that any rotation rate measurement frequency values $f_\Omega$ calculated by feed-forward rate processor 135 from them would be invalid and unusable. Feed-forward rate processor 135, for the time period 525 between switch initiation at 522 and servo loop relocked at 526, therefore discards its calculated values for rotation rate measurements $f_\Omega$ and instead substitutes extrapolated values (shown at 512) calculated from the statistical curve fit 510.

Figure 6:
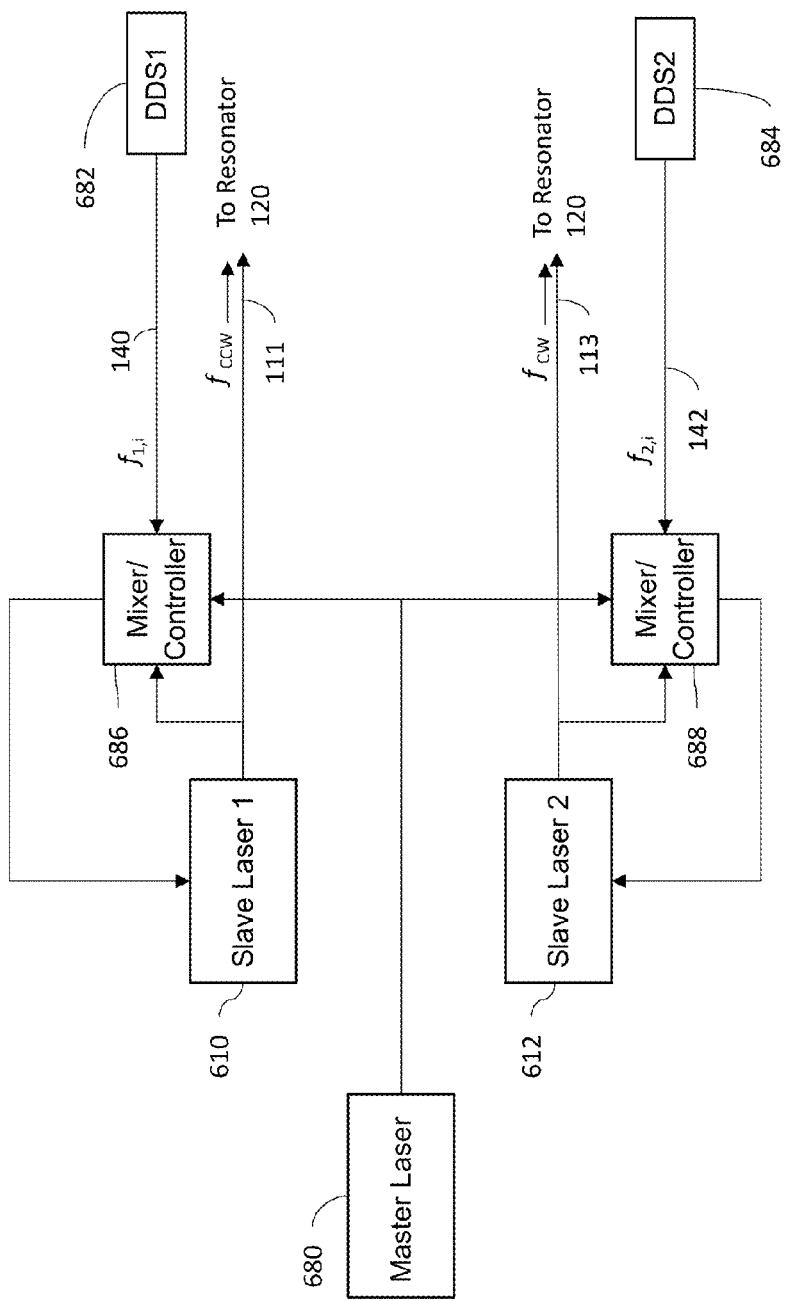
FIG. 6 is a diagram illustrating implementation of two laser sources for a resonating fiber optic gyroscope system of one embodiment of the present disclosure.

FIG. 6 is a block diagram illustrating one example of an implementation of laser sources 110 and 112 shown in FIG. 1. In FIG. 6, laser source 110 is implemented by first slave laser 610 and laser source 112 is implemented by a second slave laser 612. In this embodiment, RFOG 100 further comprises a third laser referred to as a master laser 680. To generate optical beam 101 at the desired frequency $f_{ccw}$, laser light from master laser 680 and slave layer 610 are mixed together at mixer/controller 686 (which may comprise an optical coupler). Within mixer/controller 686 a signal is developed having a beat note at the optical frequency difference between the two laser light beams. Mixer/controller 686 converts that beat note into an electrical signal. Using the resonance frequency $f_1$ output 140 from DDS1 682 in servo loop 130 as a reference, mixer/controller 686 calculates an error in beat note electrical signal and provides a control signal to slave laser 610 to control the frequency of the laser light output from slave laser 610, which forms optical beam 101. To generate optical beam 102 at the desired frequency $f_{cw}$, laser light from master laser 680 and slave layer 612 are mixed together at mixer/controller 688 (which may comprise an optical coupler). Within mixer/controller 688 a signal is developed having a beat note at the optical frequency difference between the two laser light beams. Mixer/controller 688 converts that beat note into an electrical signal. Using the resonance frequency $f_2$ output 142 from DDS2 684 in servo loop 132 as a reference, mixer/controller 688 calculates an error in beat note electrical signal and provides a control signal to slave laser 612 to control the frequency of the laser light output from slave laser 612, which forms optical beam 102.

Figure 7:
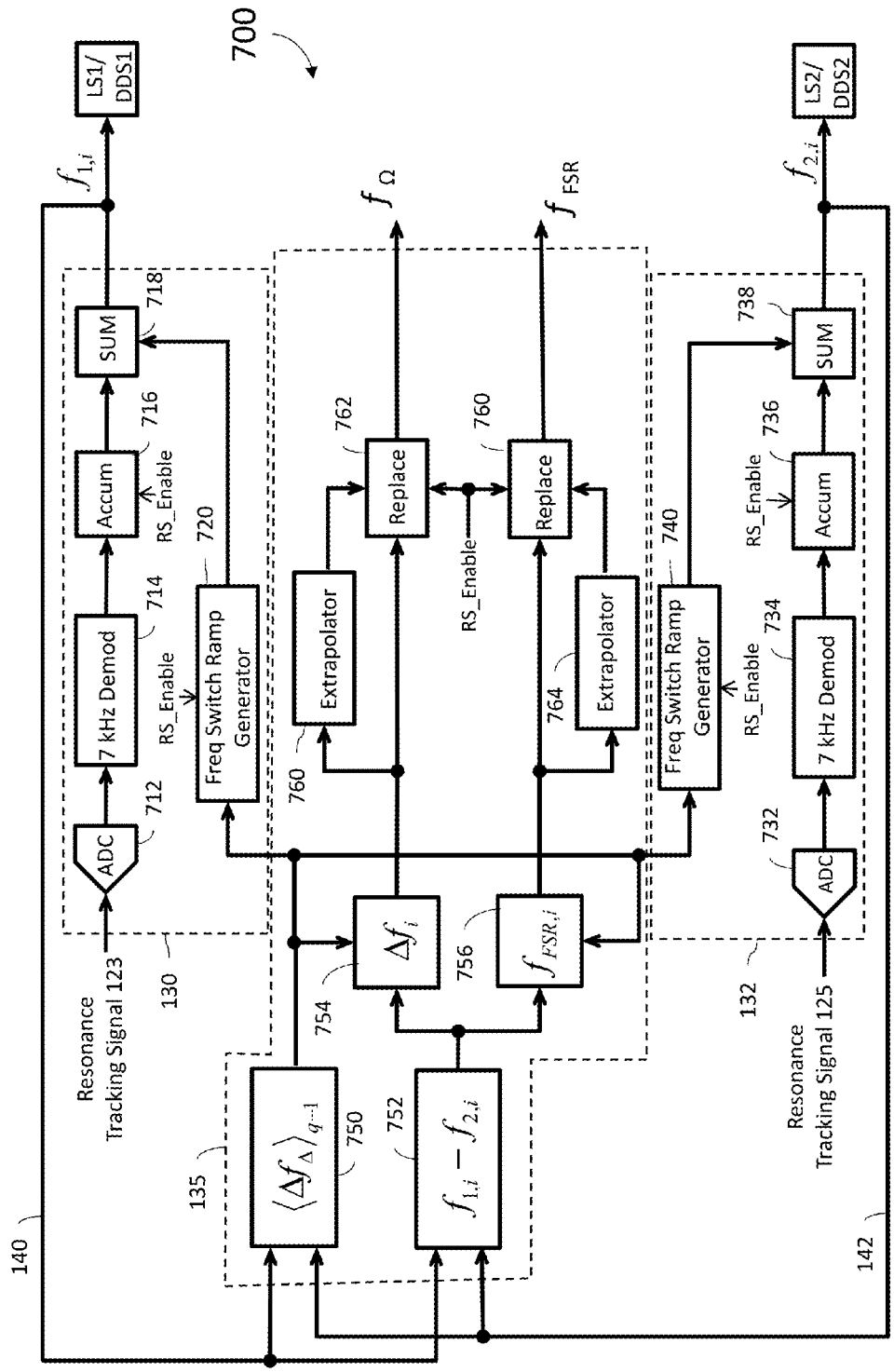
FIG. 7 is a diagram illustrating resonance switching servo loops in combination with a feed forward rate processor for a resonating fiber optic gyroscope system of one embodiment of the present disclosure.

FIG. 7 is a block diagram illustrating at 700 one example design for implementing resonance switching servo loops 130 and 132 in combination with feed-forward rate processor 135. As such, the following description of elements with respect to FIG. 7 are applicable to FIG. 1 and vice versa. As shown in FIG. 7, in this implementation, resonance switching servo loop 130 and 132 each comprises an analog to digital converter (ADC), a phase demodulator (Demod), and accumulator (Accum), a summer, a frequency switch ramp generator and a first laser source offset register. In operation, resonance switching servo loop 130 inputs resonance tracking signal 123 where it is digitized by ADC 712 and demodulated by demodulator 714, providing a digital error signal indicating the degree to which optical beam 101 is on resonance. If optical beam 101 is on resonance, then the error signal zeros out. Accumulator 716 adds the digital error signal to a register of previous error signal values. The result is a digital output proportional to $f_1$ that passed through summer 718 (discussed below) as the control signal 140. In the embodiment shown in FIG. 7, control signal 140 is a digital signal communicated to a first DDS (such as DDS 682, for example). This DDS converts the digital signal to an analog frequency reference control signal provided to laser source 110 to control the frequency of the optical beam 101. At the same time, resonance switching servo loop 132 inputs resonance tracking signal 125 where it is digitized by ADC 732 and demodulated by demodulator 734, providing a digital error signal indicating the degree to which optical beam 102 is on resonance. If optical beam 102 is on resonance, then the error signal zeros out. Accumulator 736 adds the digital error signal to a register of previous error signal values. The result is a digital output proportional to $f_2$ that passed through summer 738 (discussed below) as the control signal 142. In the embodiment shown in FIG. 7, control signal 142 is a digital signal communicated to a first DDS (such as DDS 684, for example). This DDS converts the digital signal to an analog frequency reference control signal provided to laser source 112 to control the frequency of the optical beam 102.

Feed-forward rate processor 135 inputs the $f_1$ and $f_2$ values generated by servo loops 130 and 132 via signals 140 and 142. As shown at 750, feed-forward rate processor 135 includes an averaging algorithm to calculate $<\Delta f_\Delta>_{q-1}$, from which the free spectral range average for the immediately preceding switching period can be calculated using $<\Delta f_\Delta>_{q-1} = <\Delta f>_{q-1} - <\Delta f>_{q-2} = <2f_{FSR}>$ as discussed above. Feed-forward rate processor 135 includes a frequency difference algorithm $f_{1,i} - f_{2,i}$, shown at 752 to take the difference between the currently generated resonant frequency measurement samples $f_1$ and $f_2$. The rotation rate measurement sample $f_{\Omega,i}$ is then calculated at 754 using $$-f_{\Omega,i} = f_{1,i} - f_{2,i} + \frac{1}{2} <\Delta f_\Delta >_{q-1}$$

as discussed above with respect to FIG. 3 and $f_{\Omega,i}$ is provided as an output from RFOG 100. For the reasons discussed above, the rotation rate measurement $f_{\Omega,i}$ may be generated at a sample rate many times faster than resonance switching period employed for calculating $<\Delta f_\Delta>_{q-1}$.

In one embodiment, feed-forward rate processor 135 may also optionally include an instantaneous $f_{FSR}$ measurement algorithm (shown at 756) based on the relationship $2f_{FSR} = \Delta f_\Delta = \Delta f' - \Delta f$ as discussed above, also provided as an output from RFOG 100.

In the implementation shown in FIG. 7, switching of the servo loops 130 and 132 between resonance modes is initiated within servo loops 130 and 132 by an RS-Enable signal which may be generated by feed-forward rate processor 135. Using resonance switching servo loop 130 as an example, when the RS-Enable signal is activated, accumulator 716 is disabled, meaning that it ceases to further update its register, essentially unlocking optical beam 101 from its current resonant mode. The RS-Enable signal is also provided as an input to a frequency switch ramp generator 720 within resonance switching servo loop 130. The output of frequency switch ramp generator 720 is summed with the present value stored in accumulator 716 by summer 718. When the RS-Enable signal is not active, the output of frequency switch ramp generator 720 is held constant at its terminal value and summer 718 passes the summed output of accumulator 716 and ramp generator 720 as control signal 140. When the RS-Enable signal is activated, the accumulator 716 output is held constant and no longer controls the laser frequency, and the frequency switch ramp generator 720 produces a ramped output that is summed with the constant output of accumulator 716 and drives the control signal 140 to the next resonance mode. In one embodiment, to drive the control signal 140 to the next higher resonance mode, frequency switch ramp generator 720 ramps from an initial value corresponding to the nominal lower resonance frequency to a final value that is the initial value +1 $f_{FSR}$. Similarly, to drive the control signal 140 to the next lower resonance mode, frequency switch ramp generator 720 ramps from an initial value output to a final output of the initial value −1 $f_{FSR}$. Because the exact value of $f_{FSR}$ and the specific resonance frequency of the next resonance mode are both dynamic and not precisely known (because they change with temperature and the rotational acceleration of RFOG 100), frequency switch ramp generator 720 is also provided with an estimate of the current $f_{FSR}$ from the calculation of $<\Delta f_\Delta>_{q-1}$ by block 754. That is, by ramping optical beam 101 either $$+\frac{1}{2} <\Delta f_\Delta >_{q-1}$$

or $$-\frac{1}{2} <\Delta f_\Delta >_{q-1},$$

resonance switching servo loop 130 will switch optical beam 101 approximately one $f_{FSR}$, thus reducing the error that resonance switching servo loop 130 will need to servo out to lock optical beam 101 onto the new resonant mode. When the frequency ramp generator 720 completes its frequency ramp, the RS-Enable signal is deactivated and accumulator 716 is enabled. Since frequency ramp generator ramps the laser frequency by approximately 1 $f_{FSR}$, the accumulator 716 output is already very near the necessary value to maintain the optical beam 101 on resonance and thus quickly controls the optical beam 101 onto resonance.

Resonance switching servo loop 132 responds to the RS-Enable signal to initiate switching in the exact same manner. When the RS-Enable signal is activated, accumulator 736 is disabled, meaning that it ceases to further update its register, essentially unlocking optical beam 102 from its current resonant mode. The RS-Enable signal is also provided as an input to a frequency switch ramp generator 740 within resonance switching servo loop 132. The output of frequency switch ramp generator 740 is summed with the output of accumulator 736 by summer 738. When the RS-Enable signal is not active, the output of frequency switch ramp generator 740 is held constant at its terminal value and summer 738 passes the summed output of accumulator 736 and ramp generator 740 as control signal 142. When the RS-Enable signal is activated, the accumulator 736 output is held constant and no longer controls the laser frequency, and the frequency switch ramp generator 740 produces a ramped output that is summed with the constant output of accumulator 736 and drives the control signal 142 to the next resonance mode. In one embodiment, to drive the control signal 142 to the next higher resonance mode, frequency switch ramp generator 740 ramps from an initial value corresponding to the nominal lower resonance frequency to a final value that is the initial value +1 $f_{FSR}$. Similarly, to drive the control signal 142 to the next lower resonance mode, frequency switch ramp generator 740 ramps from an initial value output to a final output of the initial value $-1$ $f_{FSR}$. Because the exact value of $f_{FSR}$ and the specific frequency of the next resonance mode are both dynamic and not precisely known (because the change with temperature and the rotational acceleration of RFOG 100), frequency switch ramp generator 740 is also provided with an estimate of the current $f_{FSR}$ from the calculation of $\langle\Delta f_{\Delta}\rangle_{q-1}$ by block 754. That is, by ramping optical beam 102 either $$+\frac{1}{2}\langle\Delta f_{\Delta}\rangle_{q-1}$$

or $$-\frac{1}{2}\langle\Delta f_{\Delta}\rangle_{q-1},$$

resonance switching servo loop 132 will switch optical beam 102 approximately one $f_{FSR}$, thus reducing the error that resonance switching servo loop 132 will need to servo out to lock optical beam 102 onto the new resonant mode. When the frequency ramp generator 740 completes its frequency ramp, the RS-Enable signal is deactivated and accumulator 736 is enabled. Since frequency ramp generator ramps the laser frequency by approximately 1 $f_{FSR}$, the accumulator 736 output is already very near the necessary value to maintain the optical beam 101 on resonance and thus quickly controls the optical beam 102 onto resonance. When RS-Enable is deactivated, resonance switching servo loops 130 and 132 both resume normal operation, now locked to their new resonance modes.

Activation of the RS-Enable signal is also utilized to trigger the replacement of corrupted rotation rate measurements $f_\Omega$ with extrapolated values such as described above with respect to FIG. 5. In one embodiment, an extrapolator 760 within feed-forward rate processor 135 implements an algorithm that calculates the statistical curve fit 410 over the pre-specified segment of valid $f_\Omega$ data 520 occurring just before the RS-Enable signal is activated to initiate the resonant mode switch operation (at 522 of FIG. 5). When the RS-Enable signal is not activated, the replace function 762 permits the valid $f_\Omega$ data to flow through as the output of RFOG 100. When the RS-Enable signal is activated, the replace function 762 discards the corrupt $f_\Omega$ data coming from block 754 and instead replaces that data with the extrapolated estimated of rotation rate $f_\Omega$ calculated by extrapolator 760. That is, as long as the RS-Enable signal is activated, the rotation rate output of RFOG 100 will be based on the extrapolated estimated of rotation rate $f_\Omega$.

For embodiments that also provide an instantaneous $f_{FSR}$ measurement algorithm (shown at 756), the feed-forward rate processor 135 further may include an optional second extrapolator 764 within feed-forward rate processor 135 that implements an algorithm that calculates a statistical curve fit over a pre-specified segment of valid $f_{FSR,i}$ data occurring just before the RS-Enable signal is activated. When the RS-Enable signal is not activated, the replace function 766 permits the valid $f_{FSR,i}$ data from block 756 to flow through as an output of RFOG 100. When the RS-Enable signal is activated, the replace function 766 discards corrupt $f_{FSR,i}$ data from block 756 and instead replaces that data with the extrapolated estimated of $f_{FSR,i}$ calculated by extrapolator 764. That is, as long as the RS-Enable signal is activated, the $f_{FSR,i}$ output of RFOG 100 will be based on the extrapolated estimated of $f_{FSR,i}$.

EXAMPLE EMBODIMENTS

Example 1 includes a feed-forward rotation rate processing method for a resonating fiber optic gyroscope having an optical resonator, the method comprising: operating the resonating fiber optic gyroscope, for a first period of time, with a first optical beam locked to a first resonance mode $M_1$ of the optical resonator, and a second optical beam locked to a second resonance mode $M_2$ of the optical resonator, the second optical beam propagating around the optical resonator in a direction opposite to the first optical beam; calculating, for the first period of time, a first resonance frequency measurement average based on the first optical beam output and a second resonance frequency measurement average for based on the second optical beam output; operating the resonating fiber optic gyroscope, for a second period of time following the first period of time, with the first optical beam locked to the second resonance mode $M_2$ of the optical resonator, and the second optical beam locked to the first resonance mode $M_1$ of the optical resonator; calculating, for the second period of time, a third resonance frequency average for the first optical beam, and a fourth resonance frequency average for the second optical beam; calculating a free spectral range average over the first period of time and the second period of time as a function of the first resonance frequency average, the second resonance frequency average, third resonance frequency average, and the fourth resonance frequency average; generating a rotation rate measurement frequency value $f_\Omega$ sample signal based on a function of a first resonance frequency measurement for the first optical beam captured after the second period of time, a second resonance frequency measurement for the second optical beam captured after the second period of time, and the free spectral range average.

Example 2 includes the method of example 1, wherein the first resonance mode $M_1$ and the second resonance mode $M_2$ are separated in frequency by one free spectral range (FSR).

Example 3 includes the method of any of examples 1-2, wherein the first period of time and the second period of time are of equal time duration.

Example 4 includes the method of any of examples 1-3, wherein the free spectral range average includes a measure of line shape asymmetry gradient error.

Example 5 includes the method of any of examples 1-4, further comprising: generating the first optical beam with a first laser source controlled by a first resonance switching servo loop; and generating the second optical beam with a second laser source controlled by a second resonance switching servo loop.

Example 6 includes the method of example 5, further comprising: ramping an output of the first resonance switching servo loop to switch the first optical beam from the first resonance mode $M_1$ to the second resonance mode $M_2$ based on the free spectral range average; and ramping an output of the second resonance switching servo loop to switch the second optical beam from the second resonance mode $M_2$ to the first resonance mode $M_1$ based on the free spectral range average.

Example 7 includes the method of any of examples 1-6, wherein generating the rotation rate measurement $f_\Omega$ sample signal further comprises calculating a rotation rate measurement $f_\Omega$ from an equation equivalent to:

$$-f_\Omega = f_1 - f_2 + \frac{1}{2} \langle \Delta f_\Delta \rangle$$

where $f_1$ is a current resonant frequency measurement for the first optical beam, $f_2$ is a current resonant frequency measurement for the second optical beam, and $$\frac{1}{2} \langle \Delta f_\Delta \rangle$$

is equal to the free spectral range average.

Example 8 includes the method of example 7, wherein the term $$\frac{1}{2} \langle \Delta f_\Delta \rangle$$

is calculated from:

$$\langle \Delta f \rangle_{q-2} = \langle f_1 \rangle_{q-2} - \langle f_2 \rangle_{q-2}$$

$$\langle \Delta f \rangle_{q-1} = \langle f_1 \rangle_{q-1} - \langle f_2 \rangle_{q-1}$$

$$\langle \Delta f_\Delta \rangle = \langle \Delta f \rangle_{q-1} - \langle \Delta f \rangle_{q-2} = \langle 2 f_{FSR} \rangle$$

where $\langle f_1 \rangle_{q-2}$ is equal to the first resonance frequency average for the first optical beam, where $\langle f_2 \rangle_{q-2}$ is equal to the second resonance frequency average for the second optical beam, where $\langle f_2 \rangle_{q-1}$ is equal to the third resonance frequency average for the first optical beam, and where $\langle f_1 \rangle_{q-1}$ is equal to the fourth resonance frequency average for the second optical beam.

Example 9 includes the method of any of examples 1-8, further comprising: calculating a statistical curve fit over a pre-specified segment of valid rotation rate measurement frequency value $f_\Omega$ sample data; and generating the rotation rate measurement frequency value $f_\Omega$ sample signal from rotation rate data extrapolated from the statistical curve fit during a switching operation between the first period of time and the second period of time in which the first optical beam is switching between resonance mode $M_1$ and $M_2$, and when the second optical beam is switching between resonance mode $M_2$ and $M_1$.

Example 10 includes a resonating fiber optic gyroscope system with feed-forward rotation rate processing, the system comprising: a fiber optic resonator; a first laser source and a second laser source each coupled to the fiber optic resonator, wherein the first laser source launches a first optical beam into the fiber optic resonator and the second laser source launches a second optical beam into the fiber optic resonator in a direction opposite to the first optical beam; a first resonance switching servo loop configured to lock the first optical beam to a first resonant mode $M_1$ of the fiber optic resonator during a first switching state, and lock the first optical beam to a second resonant mode $M_2$ of the fiber optic resonator during a second switching state; a second resonance switching servo loop configured to lock the second optical beam to the second resonant mode $M_2$ during the first switching state, and lock the second optical beam to the first resonant mode $M_1$ during the second switching state; a feed-forward rate processor coupled to the first resonance switching servo loop and the second resonance switching servo loop, wherein the feed-forward rate processor calculates a free spectral range average across a prior resonance switching cycle of resonant frequency measurements and applies the free spectral range average to current resonant frequency measurements to output a rotation rate measurement frequency value $f_\Omega$ sample signal.

Example 11 includes the system of example 10, wherein the first resonance mode $M_1$ and the second resonance mode $M_2$ are separated in frequency by one free spectral range (FSR).

Example 12 includes the system of any of examples 10-11, wherein the free spectral range average includes a measure of line shape asymmetry gradient error.

Example 13 includes the system of any of examples 10-12, wherein the prior resonance switching cycle comprises: a first period of time with the first optical beam locked to the first resonance mode $M_1$ of the optical resonator, and the second optical beam locked to the second resonance mode $M_2$ of the optical resonator; and a second period of time following the first period of time, with the first optical beam locked to the second resonance mode $M_2$ of the optical resonator, and the second optical beam locked to the first resonance mode $M_1$ of the optical resonator; wherein the free spectral range average is calculated over the first period of time and the second period of time.

Example 14 includes the system of example 13, wherein the first period of time and the second period of time are of equal time duration.

Example 15 includes the system of any of examples 13-14, wherein the feed-forward rate processor calculates for the first period of time, a first resonance frequency average based on the first optical beam traveling in the fiber optic resonator and a second resonance frequency average based on the second optical beam traveling in the fiber optic resonator; and wherein the feed-forward rate processor calculates for the second period of time, a third resonance frequency average based on the first optical beam traveling in the fiber optic resonator, and a fourth resonance frequency average based on the second optical beam traveling in the r fiber optic resonator.

Example 16 includes the system of example 15, wherein the feed-forward rate processor calculates the free spectral range average over the first period of time and the second period of time as a function of the first resonance frequency average, the second resonance frequency average, third resonance frequency average, and the fourth resonance frequency average.

Example 17 includes the system of any of examples 10-16, wherein the feed-forward rate processor calculates a statistical curve fit over a pre-specified segment of valid rotation rate measurement frequency value $f_\Omega$ sample data; and wherein the feed-forward rate processor generates the rotation rate measurement frequency value $f_\Omega$ sample signal from rotation rate data extrapolated from the statistical curve fit during a switching operation in which the first optical beam is switched between resonance mode $M_1$ and $M_2$, and in which the second optical beam is switched between resonance mode $M_2$ and $M_1$.

Example 18 includes the system of any of examples 10-17, wherein the feed-forward rate processor calculates the rotation rate measurement frequency value $f_\Omega$ samples from an equation equivalent to:

$$-f_\Omega = f_1 - f_2 + \frac{1}{2} \langle \Delta f_\Delta \rangle$$

where $f_1$ is a current resonant frequency measurement of the first optical beam, $f_2$ is a current resonant frequency measurement of the second optical beam, and $$\frac{1}{2} < \Delta f_\Delta >$$

is equal to the free spectral range average.

Example 19 includes the system of any of examples 10-18, wherein the first resonance switching servo loop comprises: a first frequency switch ramp generator that receives the free spectral range average from the feed-forward rate processor; wherein the frequency switch ramp generator ramps an output of the first resonance switching servo loop to switch the first optical beam from the first resonance mode $M_1$ to the second resonance mode $M_2$ based on the free spectral range average.

Example 20 includes the system of example 19, wherein the second resonance switching servo loop comprises: a second frequency switch ramp generator that receives the free spectral range average from the feed-forward rate processor; wherein the second frequency switch ramp generator ramps an output of the second resonance switching servo loop to switch the first optical beam from the second resonance mode $M_2$ to the first resonance mode $M_1$ based on the free spectral range average.

In various alternative embodiments, system elements, method steps, or examples described throughout this disclosure (such as the resonator switching servo loops or the feed-forward rate processor, or sub-parts thereof, for example) may be implemented on one or more computer systems, field programmable gate array (FPGA), or similar devices comprising a processor executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A feed-forward rotation rate processing method for a resonating fiber optic gyroscope having an optical resonator, the method comprising:
    operating the resonating fiber optic gyroscope, for a first period of time, with a first optical beam locked to a first resonance mode $M_1$ of the optical resonator, and a second optical beam locked to a second resonance mode $M_2$ of the optical resonator, the second optical beam propagating around the optical resonator in a direction opposite to the first optical beam;
    calculating, for the first period of time, a first resonance frequency measurement average based on the first optical beam output and a second resonance frequency measurement average for based on the second optical beam output;
    operating the resonating fiber optic gyroscope, for a second period of time following the first period of time, with the first optical beam locked to the second resonance mode $M_2$ of the optical resonator, and the second optical beam locked to the first resonance mode $M_1$ of the optical resonator;
    calculating, for the second period of time, a third resonance frequency average for the first optical beam, and a fourth resonance frequency average for the second optical beam;
    calculating a free spectral range average over the first period of time and the second period of time as a function of the first resonance frequency average, the second resonance frequency average, third resonance frequency average, and the fourth resonance frequency average;
    generating a rotation rate measurement frequency value $f_\Omega$ sample signal based on a function of a first resonance frequency measurement for the first optical beam captured after the second period of time, a second resonance frequency measurement for the second optical beam captured after the second period of time, and the free spectral range average.

2. The method of claim 1, wherein the first resonance mode $M_1$ and the second resonance mode $M_2$ are separated in frequency by one free spectral range (FSR).

3. The method of claim 1, wherein the first period of time and the second period of time are of equal time duration.

4. The method of claim 1, wherein the free spectral range average includes a measure of line shape asymmetry gradient error.

5. The method of claim 1, further comprising:
    generating the first optical beam with a first laser source controlled by a first resonance switching servo loop; and
    generating the second optical beam with a second laser source controlled by a second resonance switching servo loop.

6. The method of claim 5, further comprising:
    ramping an output of the first resonance switching servo loop to switch the first optical beam from the first resonance mode $M_1$ to the second resonance mode $M_2$ based on the free spectral range average; and
    ramping an output of the second resonance switching servo loop to switch the second optical beam from the second resonance mode $M_2$ to the first resonance mode $M_1$ based on the free spectral range average.

7. The method of claim 1, wherein generating the rotation rate measurement $f_\Omega$ sample signal further comprises calculating a rotation rate measurement $f_\Omega$ from an equation equivalent to:

$$-f_\Omega = f_1 - f_2 + \frac{1}{2}\langle \Delta f_\Delta \rangle$$

where $f_1$ is a current resonant frequency measurement for the first optical beam, $f_2$ is a current resonant frequency measurement for the second optical beam, and $$\frac{1}{2}\langle \Delta f_\Delta \rangle$$

is equal to the free spectral range average.

8. The method of claim 7, wherein the term $$\frac{1}{2}\langle \Delta f_\Delta \rangle$$

is calculated from:

$$\langle \Delta f \rangle_{q-2} = \langle f_1 \rangle_{q-2} - \langle f_2 \rangle_{q-2}$$

$$\langle \Delta f \rangle_{q-1} = \langle f_1 \rangle_{q-1} - \langle f_2 \rangle_{q-1}$$

$$\langle \Delta f_\Delta \rangle = \langle \Delta f \rangle_{q-1} - \langle \Delta f \rangle_{q-2} = \langle 2f_{FSR} \rangle$$

where $\langle f_1 \rangle_{q-2}$ is equal to the first resonance frequency average for the first optical beam, where $\langle f_2 \rangle_{q-2}$ is equal to the second resonance frequency average for the second optical beam, where $\langle f_2 \rangle_{q-1}$ is equal to the third resonance frequency average for the first optical beam, and where $\langle f_1 \rangle_{q-1}$ is equal to the fourth resonance frequency average for the second optical beam.

9. The method of claim 1, further comprising:
calculating a statistical curve fit over a pre-specified segment of valid rotation rate measurement frequency value $f_\Omega$ sample data; and
generating the rotation rate measurement frequency value $f_\Omega$ sample signal from rotation rate data extrapolated from the statistical curve fit during a switching operation between the first period of time and the second period of time in which the first optical beam is switching between resonance mode $M_1$ and $M_2$, and when the second optical beam is switching between resonance mode $M_2$ and $M_1$.

10. A resonating fiber optic gyroscope system with feed-forward rotation rate processing, the system comprising:
a fiber optic resonator;
a first laser source and a second laser source each coupled to the fiber optic resonator, wherein the first laser source launches a first optical beam into the fiber optic resonator and the second laser source launches a second optical beam into the fiber optic resonator in a direction opposite to the first optical beam;
a first resonance switching servo loop configured to lock the first optical beam to a first resonant mode $M_1$ of the fiber optic resonator during a first switching state, and lock the first optical beam to a second resonant mode $M_2$ of the fiber optic resonator during a second switching state;
a second resonance switching servo loop configured to lock the second optical beam to the second resonant mode $M_2$ during the first switching state, and lock the second optical beam to the first resonant mode $M_1$ during the second switching state;
a feed-forward rate processor coupled to the first resonance switching servo loop and the second resonance switching servo loop, wherein the feed-forward rate processor calculates a free spectral range average across a prior resonance switching cycle of resonant frequency measurements and applies the free spectral range average to current resonant frequency measurements to output a rotation rate measurement frequency value $f_\Omega$ sample signal.

11. The system of claim 10, wherein the first resonance mode $M_1$ and the second resonance mode $M_2$ are separated in frequency by one free spectral range (FSR).

12. The system of claim 10, wherein the free spectral range average includes a measure of line shape asymmetry gradient error.

13. The system of claim 10, wherein the prior resonance switching cycle comprises:
a first period of time with the first optical beam locked to the first resonance mode $M_1$ of the optical resonator, and the second optical beam locked to the second resonance mode $M_2$ of the optical resonator; and
a second period of time following the first period of time, with the first optical beam locked to the second resonance mode $M_2$ of the optical resonator, and the second optical beam locked to the first resonance mode $M_1$ of the optical resonator;
wherein the free spectral range average is calculated over the first period of time and the second period of time.

14. The system of claim 13, wherein the first period of time and the second period of time are of equal time duration.

15. The system of claim 13, wherein the feed-forward rate processor calculates for the first period of time, a first resonance frequency average based on the first optical beam traveling in the fiber optic resonator and a second resonance frequency average based on the second optical beam traveling in the fiber optic resonator; and
wherein the feed-forward rate processor calculates for the second period of time, a third resonance frequency average based on the first optical beam traveling in the fiber optic resonator, and a fourth resonance frequency average based on the second optical beam traveling in the r fiber optic resonator.

16. The system of claim 15, wherein the feed-forward rate processor calculates the free spectral range average over the first period of time and the second period of time as a function of the first resonance frequency average, the second resonance frequency average, third resonance frequency average, and the fourth resonance frequency average.

17. The system of claim 10, wherein the feed-forward rate processor calculates a statistical curve fit over a pre-specified segment of valid rotation rate measurement frequency value $f_\Omega$ sample data; and
wherein the feed-forward rate processor generates the rotation rate measurement frequency value $f_\Omega$ sample signal from rotation rate data extrapolated from the statistical curve fit during a switching operation in which the first optical beam is switched between resonance mode $M_1$ and $M_2$, and in which the second optical beam is switched between resonance mode $M_2$ and $M_1$.

18. The system of claim 10, wherein the feed-forward rate processor calculates the rotation rate measurement frequency value $f_\Omega$ samples from an equation equivalent to:

$$-f_\Omega = f_1 - f_2 + \frac{1}{2} <\Delta f_\Delta>$$

where $f_1$ is a current resonant frequency measurement of the first optical beam, $f_2$ is a current resonant frequency measurement of the second optical beam, and $$\frac{1}{2}<\Delta f_\Delta>$$

is equal to the free spectral range average.

19. The system of claim 10, wherein the first resonance switching servo loop comprises:
   a first frequency switch ramp generator that receives the free spectral range average from the feed-forward rate processor;
   wherein the frequency switch ramp generator ramps an output of the first resonance switching servo loop to switch the first optical beam from the first resonance mode $M_1$ to the second resonance mode $M_2$ based on the free spectral range average.

20. The system of claim 19, wherein the second resonance switching servo loop comprises:
   a second frequency switch ramp generator that receives the free spectral range average from the feed-forward rate processor;
   wherein the second frequency switch ramp generator ramps an output of the second resonance switching servo loop to switch the first optical beam from the second resonance mode $M_2$ to the first resonance mode $M_1$ based on the free spectral range average.

* * * * *